US010769578B2

(12) United States Patent
Wilkinson et al.

(10) Patent No.: US 10,769,578 B2
(45) Date of Patent: Sep. 8, 2020

(54) SYSTEM AND METHOD FOR FACILITATING PICK UP OF PRODUCTS ORDERED BY A CUSTOMER BY A FRIEND OR FAMILY MEMBER OF THE CUSTOMER

(71) Applicant: Walmart Apollo, LLC, Bentonville, AR (US)

(72) Inventors: Bruce W. Wilkinson, Rogers, AR (US); Sai Phaneendra Sri Harsha Viswanath Putcha, Bentonville, AR (US); Balaraman Kirthigaivasan, Bentonville, AR (US); Todd D. Mattingly, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 369 days.

(21) Appl. No.: 15/646,568

(22) Filed: Jul. 11, 2017

(65) Prior Publication Data

US 2018/0012179 A1    Jan. 11, 2018

Related U.S. Application Data

(60) Provisional application No. 62/360,781, filed on Jul. 11, 2016.

(51) Int. Cl.
*G06Q 30/00* (2012.01)
*G06Q 10/08* (2012.01)
(Continued)

(52) U.S. Cl.
CPC ..... *G06Q 10/0836* (2013.01); *G06Q 30/0261* (2013.01); *G06Q 30/0601* (2013.01);
(Continued)

(58) Field of Classification Search
CPC . G06Q 30/0601–0645; G06Q 10/0836; G06Q 50/01; G06Q 30/0631;
(Continued)

(56) References Cited

U.S. PATENT DOCUMENTS 8,224,707 B1   7/2012   Smith
8,630,921 B2   1/2014   Nuzzi
(Continued)

OTHER PUBLICATIONS

Duffy, Jill. Get Organized: Using Location-Based Reminders. Jun. 30, 2014 (Jun. 20, 2014). Published by PCMag. (Year: 2014).*
(Continued)

*Primary Examiner* — Jeffrey A. Smith
*Assistant Examiner* — Allison G Wood
(74) *Attorney, Agent, or Firm* — Fitch, Even, Tabin & Flannery, LLP (57) ABSTRACT

In some embodiments, methods and systems are provided that permit a customer to purchase products from a retailer and elect an option for a friend or family member of the customer to pick up the ordered products from the retail facility of the retailer associated with the geographic location of the customer. If the friend or family member of the customer agrees to pick up the products for the customer, and if the customer agrees to have the selected friend or family member of the customer pick up the products for the customer, the friend or family member is allowed to pick up the products at the retail facility associated with the geographic location of the customer. The customer is then allowed to either pick up the products from such a friend or family member or the friend or family member may deliver the products to the customer.

16 Claims, 3 Drawing Sheets

(51) Int. Cl.
  *G06Q 30/06* (2012.01)
  *G06Q 30/02* (2012.01)
  *G06Q 50/00* (2012.01)

(52) U.S. Cl.
  CPC ..... *G06Q 30/0631* (2013.01); *G06Q 30/0633* (2013.01); *G06Q 30/0635* (2013.01); *G06Q 30/0639* (2013.01); *G06Q 50/01* (2013.01)

(58) Field of Classification Search
  CPC .......... G06Q 30/0633; G06Q 30/0639; G06Q 30/0635; G06Q 30/0261
  USPC ............ 705/26.1–27.2, 339, 319, 26.7, 26.9, 705/14.58, 26.8, 26.81
  See application file for complete search history.

(56) References Cited

U.S. PATENT DOCUMENTS

| | | |
|---|---|---|
| 9,129,333 B2 | 9/2015 | Hardie |
| 2008/0005168 A1 | 1/2008 | Huff |
| 2013/0006816 A1* | 1/2013 | Nuzzi ............... G06Q 30/0261 705/27.1 |
| 2013/0275273 A1* | 10/2013 | Champlin .............. G06Q 10/02 705/26.81 |
| 2014/0040043 A1 | 2/2014 | Barron |
| 2014/0129380 A1 | 5/2014 | Nuzzi |
| 2014/0278634 A1 | 9/2014 | Horvitz |
| 2014/0279238 A1 | 9/2014 | Jones |
| 2015/0142591 A1* | 5/2015 | High .................. G06Q 30/0613 705/21 |

OTHER PUBLICATIONS

International Search Report and Written Opinion dated Sep. 22, 2017; in corresponding PCT App. No. PCT/US2017/41323.

Suh, Kyo, et al.; "Leveraging Socially Networked Mobile ICT Platforms for the Last-Mile Delivery Problem"; https://www.researchgate.net/publication/230644084_Leveraging_Socially_Networked_ . . . ; Apr. 6, 2016; pp. 9481-9490.

Zhao, Weidan, et al.; "LifeDelivery : Recruiting Participants to Deliver Users' Daily Goods!"; UbiComp'14 Adjunct; Sep. 13-17, 2014; pp. 199-202.

* cited by examiner

SYSTEM AND METHOD FOR FACILITATING PICK UP OF PRODUCTS ORDERED BY A CUSTOMER BY A FRIEND OR FAMILY MEMBER OF THE CUSTOMER

CROSS-REFERENCE TO RELATED APPLICATION

This application claims the benefit of U.S. Provisional Application No. 62/360,781, filed Jul. 11, 2016, and is incorporated herein by reference in its entirety.

TECHNICAL FIELD

This invention relates generally to providing products purchased to customers and, in particular, to facilitating pick up of products purchased by a customer from a retailer.

BACKGROUND

Customers often purchase products from retailers over the internet. Generally, the products purchased by a customer are delivered to an address provided by the customer. Some customers elect to pick up the products they order from a retail facility of the retailer. Delivery of products to an address provided by the customer is associated with extra costs for the retailer and for the customer. In addition, products delivered to a home address and left on the property of the customer when the customer is not home (e.g., at work) may be stolen and/or damaged by 3rd parties. On the other hand, picking up products at the retail facility of the retailer may be undesirable for customers because it is time consuming and/or inconvenient for the customers.

BRIEF DESCRIPTION OF THE DRAWINGS

Disclosed herein are embodiments of systems, apparatuses, methods, and systems pertaining to facilitating pick up of products purchased by a customer from a retailer by a friend or family member of the customer. This description includes drawings, wherein.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems and methods are provided for enabling a customer to purchase one or more products from a retailer and elect an option for a friend or family member of the customer to pick up the products ordered by the customer from the retail facility of the retailer associated with the geographic location of the customer. The customer is then allowed to either pick up the products from such a friend or family member or the friend or family member may deliver the products to the customer.

In some embodiments, a system for facilitating pick up of products purchased over a network by a customer from a retailer includes an order processing server of the retailer configured to process an order for a product placed by the customer. The system also includes a computing device of the retailer including a processor-based control circuit. The computing device is configured to access at least one social media website to identify friends and family members of the customer. The control circuit of the computing device is configured to: analyze geographic locations of the friends and family members of the customer to determine a first friend or family member of the customer located at a geographic location closest to a geographic location of a retail facility of the retailer associated with a geographic location of the customer; transmit a first electronic notification to a computing device of the first friend or family member of the customer, the first electronic notification requesting the first friend or family member of the customer to indicate agreement to pick up, at the retail facility of the retailer, the product ordered by the customer; receive a response from the computing device of the first friend or family member of the customer indicating agreement by the first friend or family member of the customer to pick up, at the retail facility of the retailer, the product ordered by the customer; and transmit a second electronic notification to a computing device of the customer, the second electronic notification indicating that the product ordered by the customer will be available for pick up at the geographic location of the first friend or family member of the customer.

In other embodiments, a method of facilitating pick up of products purchased over a network by a customer from a retailer includes: processing, at an order processing server, an order for a product placed by the customer; accessing, via a computing device of the retailer including a processor-based control circuit, at least one social media website to identify friends and family members of the customer; analyzing, via the computing device of the retailer, geographic locations of the friends and family members of the customer to determine a first friend or family member of the customer located at a geographic location closest to a geographic location of a retail facility of the retailer associated with a geographic location of the customer; transmitting, via the computing device of the retailer, a first electronic notification to a computing device of the first friend or family member of the customer, the first electronic notification requesting the first friend or family member of the customer to indicate agreement to pick up, at the retail facility of the retailer, the product ordered by the customer; receiving, at the computing device of the retailer, a response from the computing device of the first friend or family member of the customer indicating agreement by the first friend or family member of the customer to pick up, at the retail facility of the retailer, the product ordered by the customer; and transmitting, from the computing device of the retailer, a second electronic notification to a computing device of the customer, the second electronic notification indicating that the product ordered by the customer will be available for pick up at the geographic location of the first friend or family member of the customer.

Figure 1:
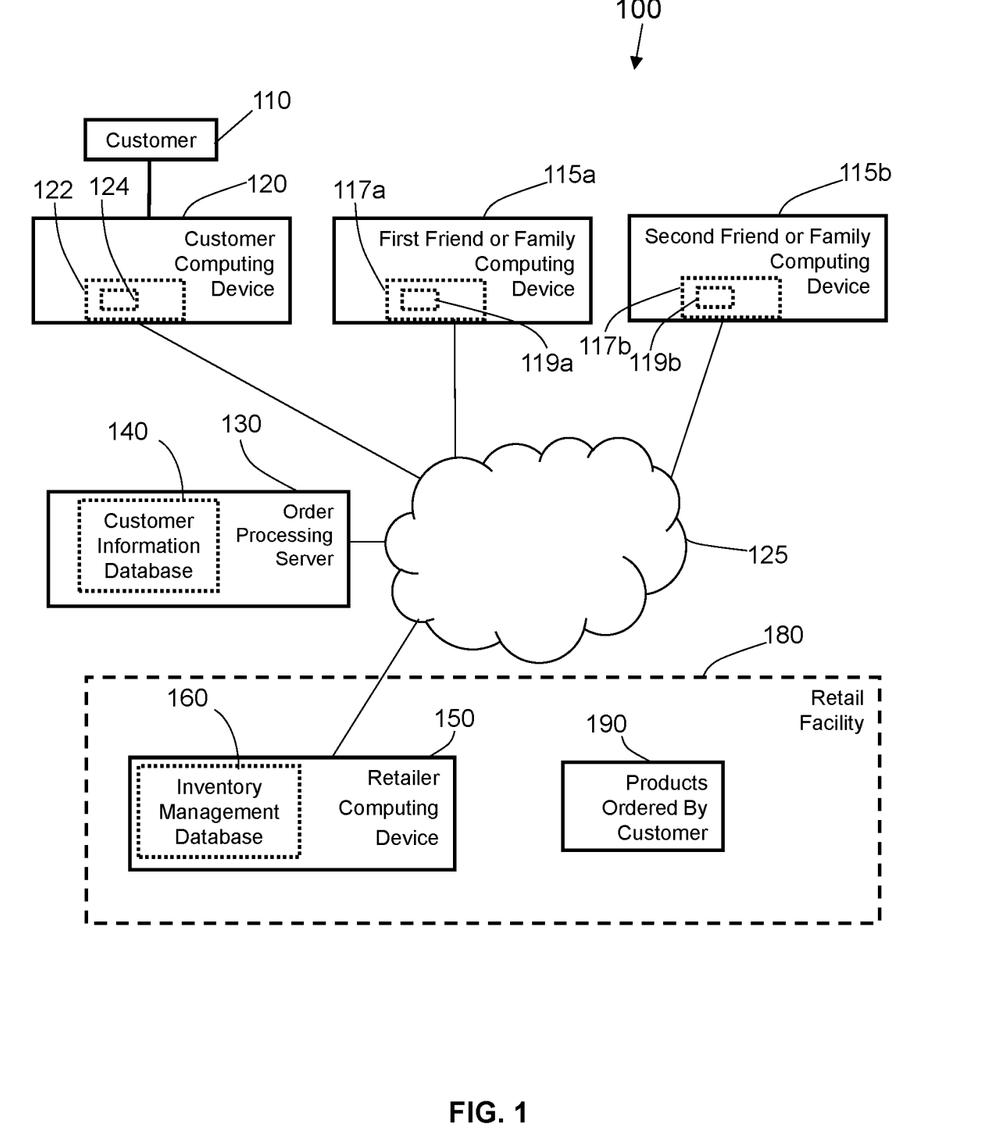
FIG. 1 is a diagram of a system of facilitating pick up of products purchased by a customer from a retailer by a friend or family member of the customer in accordance with some embodiments.

FIG. 1 shows an embodiment of a system 100 for facilitating pick up of products 190 purchased over a network by a customer 110 from a retailer. The retailer may be any entity operating as a brick-and-mortar physical location and/or a website accessible, for example, via the internet or another network, by way of which products 190 may be ordered by a customer 110. A customer 110 may be an individual or business entity. Exemplary products 190 that may be ordered by the customer 110 via the system 100 may include, but are not limited to, general-purpose consumer goods, as well as consumable products, such as medications, food items, and dietary supplements.

The exemplary system 100 depicted in FIG. 1 includes an order processing server 130 of the retailer configured to process a purchase order by the customer 110 for one or more products 190. The order processing server 130 may be implemented as one server at one location, or as multiple interconnected servers stored at multiple locations operated by or for the retailer. As described in more detail below, the order processing server 130 may communicate with one or more electronic devices of system 100 via a network 125. The network 125 may be a wide-area network (WAN), a local area network (LAN), a personal area network (PAN), a wireless local area network (WLAN), or any other internet or intranet network, or combinations of such networks. Generally, communication between variously electronic devices of system 100 may take place over hard-wired, cellular, Wi-Fi or Bluetooth networked components or the like. In some embodiments, one or more electronic devices of system 100 may include cloud-based features, such as cloud-based memory storage.

In the embodiment of FIG. 1, the order processing server 130 is coupled to a customer information database 140. In some embodiments, the customer information database 140 may be configured to store information associated with a customer 110 of the retailer who orders products 190 from the retailer. In some embodiments, the customer information database 140 may store electronic information associated with the customer 110, such as the customer's personal information, product order history, pending order status, product order options, product delivery and/or pick-up options, as well as personal information associated with friends and family of the customer 110 (which may be obtained by the retailer as described in more detail below). The customer information database 140 may be stored, for example, on non-volatile storage media (e.g., a hard drive, flash drive, or removable optical disk) internal or external to the order processing server 130, or internal or external to computing devices separate and distinct from the order processing server 130. It will be appreciated that the customer information database 140 may likewise be cloud-based. In some embodiments, the order processing server 130 may be also coupled to an electronic database configured to store information associated with the inventory of products 190 available to the customer 110 for purchase from the retailer. In other words, while the order processing server 130 is illustrated in FIG. 1 as being coupled to one electronic database, it will be appreciated that the order processing server 130 may be coupled to two or more electronic databases configured to store customer information and/or product inventory information.

In some embodiments, when a customer 110 initially sets up an online account with the retailer, the system 100 (i.e., order processing server 130 or another server on the system 100 dedicated to new customer sign-up) is configured to permit the customer 110 to generate a customer profile including personal information of the customer 110 (e.g., name, address, phone number, and the like), payment methods (e.g., credit card information), as well as product pick up settings of the customer 110 (e.g., list of friends and/or family members of the customer 110 authorized to pick up products 190 for the customer 110 from the retail facility 180). It will be appreciated that the customer 110 may select new options and/or update previously selected options at any time after setting up the account with the retailer. In some embodiments, the personal information of the customer 110 and any product pick up-related options selected by the customer 110 are stored in the customer information database 140 and/or inventory management database 160 for subsequent retrieval by the order processing server 130 and/or by a retailer computing device 150 (e.g., in response to a login request or product order placement by the customer 110).

In some embodiments, as the customer 110 is connecting to the retailer's website (e.g., via a login interface), the order processing server 130 may request a verification of the identity (e.g., username/password) of the customer 110. The order processing server 130 may first verify the identity of the customer 110 (e.g., by comparing the username/password data entered by the customer 110 into the login interface against username/password data in the profile of the customer 110 stored in the customer information database 140). The order processing server 130 may then associate the customer profile with the identity of the customer 110, retrieve the customer profile from the customer information database 140 based on information stored in the profile, and send the retrieved customer account information to the customer computing device 120, which includes a graphical interface 122 (described in more detail below) that permits the customer 110 to customize various options relating to the ordering of products 190 from the retailer and/or relating to pick up options for the products 190 at the retail facility 180 by friends or family members of the customer 110.

The customer 110 may access the order processing server 130 of the retailer via a customer computing device 120, which may be a stationary, portable, and/or hand-held electronic device, for example, a desktop computer, a laptop computer, a tablet, a mobile phone, or any other electronic, processor-based device that may be configured for data entry and communication with the order processing server 130. In some embodiments, the customer 110 may access the order processing server 130 of the retailer via a graphical interface 122 displayed to the customer 110 on the customer computing device 120. The graphical interface 122 may include one or more graphical input fields 124 in the form of menu options and/or sub-interfaces that permit the customer 110 to place an order for one or more products 190 and to select pick up options for one or more products 190 ordered by the customer 110. In some embodiments, the graphical interface 122 may be a retailer-associated mobile application (app) installed on the customer computing device 120 and configured to display various above-described menu options, notifications, and/or alerts for the customer 110. For example, electronic alerts may be transmitted to the customer computing device 120 from the retailer computing device 150 and/or from the order processing server 130 and displayed via the graphical interface 122.

In some embodiments, after placing an on order for one or more products 190 via the order processing server 130 using the graphical interface 122 of the customer computing device 120, the customer 110 does not select an option to have the products 190 delivered to the customer 110 and does not select an option to personally pick up the ordered products 190 from a retail facility 180 associated with a geographic location of the customer 110. Instead, the customer 110 selects an option to have the ordered products 190 be picked up at the retail facility 180 by a friend or family member of the customer 110 as discussed in more detail below. In other words, the order processing server 130 is configured to enable the customer 110 to permit a friend or family member of the customer 110 to pick up the products 190 ordered by the customer 110 from the retail facility 180 and to later pick up the products 190 ordered by the customer 110 from such a friend or family member.

In some embodiments, the order processing server 130 is configured to receive and process an order by a customer 110 for a product 190 from the customer computing device 120, to receive and process payment for the product 190 from the customer 110, and to transmit the customer's election of pick-up of the ordered products 190 by a friend or family of the customer 110 based on the processed order (e.g., via the network 125) to a retailer computing device 150 at the retail facility 180 associated with the geographic location of the customer 110 who placed the order. It will be appreciated that while the order processing server 130 and the retailer computing device 150 may be located at separate physical locations (e.g., regional/central data center, retail facility 180, or the like), the system 100, in some embodiments, may be confined to a single retail facility 180 of the retailer.

The retailer computing device 150 located at the retail facility 180 of the retailer may be a stationary or portable electronic device, for example, a desktop computer, a laptop computer, a tablet, a mobile phone, or any other electronic device including a processor-based control circuit (i.e., control unit). In the embodiment of FIG. 1, the retailer computing device 150 is configured for data entry and processing as well as for communication with other devices of system 100 via the network 125 which, as described above, may be a wide-area network (WAN), a local area network (LAN), a personal area network (PAN), a wireless local area network (WLAN), or any other internet or intranet network, or combinations of such networks. In some embodiments, as will be described in more detail below, the retailer computing device 150 is configured to access at least one social media website to identify friends and family members of the customers 110 who order the products 190 from the retailer.

Figure 2:
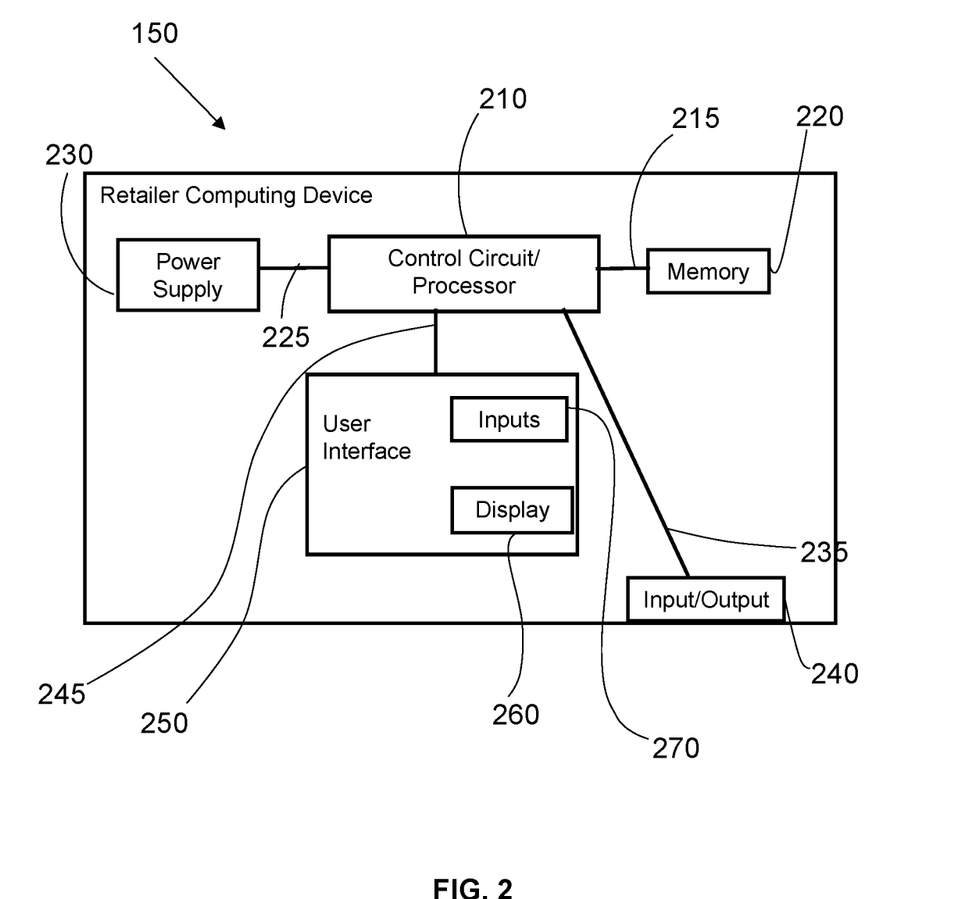
FIG. 2 is a functional diagram of an exemplary computing device usable with the system of FIG. 1 in accordance with some embodiments.

With reference to FIG. 2, an exemplary computing device 150 configured for use with exemplary systems and methods described herein may include a control circuit or control unit 210 including a processor (for example, a microprocessor or a microcontroller) electrically coupled via a connection 215 to a memory 220 and via a connection 225 to a power supply 230. The control unit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

This control unit 210 can be configured (for example, by using corresponding programming stored in the memory 220 as will be well understood by those skilled in the art) to carry out one or more of the steps, actions, and/or functions described herein. In some embodiments, the memory 220 may be integral to the processor-based control unit 210 or can be physically discrete (in whole or in part) from the control unit 210 and is configured non-transitorily store the computer instructions that, when executed by the control unit 210, cause the control unit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

The control unit 210 of the retailer computing device 150 is also electrically coupled via a connection 235 to an input/output 240 that can receive signals from the order processing server 130 (e.g., data from the customer information database 140 relating to a product order placed by the customer 110) or from any other source that can communicate with the retailer computing device 150 via a wired or wireless connection. The input/output 240 of the customer computing device 120 can also send signals to the order processing server 130 (e.g., data including product out-of-stock information regarding the product for which an order is placed by the customer 110 via the order processing server 130), or to any other device in wired or wireless communication with the retailer computing device 150.

In the embodiment shown in FIG. 2, the processor-based control unit 210 of the retailer computing device 150 is electrically coupled via a connection 245 to a user interface 250, which may include a visual display or display screen 260 (e.g., LED screen) and/or button input 270 that provide the user interface 250 with the ability to permit an operator of the retailer computing device 150 to manually control the retailer computing device 150 by inputting commands via touch-screen and/or button operation and/or voice commands to, for example, to associate the products 190 ordered by a customer 110 with the name of a friend or family member of the customer 110 approved by the customer 110 to pick up the products 190 ordered by the customer from the retail facility 180. It will be appreciated that the performance of such functions by the processor-based control unit 210 of the retailer computing device 150 is not dependent on a human operator, and that the control unit 210 may be programmed to perform such functions without a human operator.

In some embodiments, the display screen 260 of retailer computing device 150 is configured to display various graphical interface-based menus, options, and/or alerts that may be transmitted to the retailer computing device 150 and displayed on the display screen 260 in connection with various aspects of the order placed by the customer 110. The inputs 270 of the retailer computing device 150 may be configured to permit an operator to navigate through the on-screen menus on the retailer computing device 150 and make changes and/or updates to the friends and/or family members of the customer 110 who will be picking up the products 190 ordered by the customer 110 from the retail facility 180. It will be appreciated that the display screen 260 may be configured as both a display screen and an input 270 (e.g., a touch-screen that permits an operator to press on the display screen 260 to enter text and/or execute commands.)

In some embodiments, the control circuit 210 of the retailer computing device 150 is programmed to cause the retailer computing device 150 to access at least one social media website (e.g., Facebook, Instagram, Twitter, LinkedIn, etc.) to identify friends and family members of the customer 110 who placed the order for one or more products 190 via the order processing server 130. In one aspect, the control circuit 210 may be programmed to analyze geographic locations of the friends and family members of the customer identified via the accessing of the one or more social media websites to determine a first friend or family member of the customer 110 who is located at a physical address that is closest to (i.e., the shortest distance from) a geographic location of the retail facility 180 associated with a geographic location of the customer 110 who placed the order. In other words, in some embodiments, after a customer 110 places an order for one or more products 190 via the order processing server 130, the retailer computing device 150 accesses one or more social media website to identify friends and family members of the customer 110 and then determines the friend or family member that is located the shortest distance from the retail facility 180 closest to the geographic location of the customer 110.

In some embodiments, the control circuit 210 of the retailer computing device 150 is programmed to generate customer alerts in connection with the products 190 ordered by the customer 110 via the order processing server 130. The customer alerts may be generated by the retailer computing device 150 based on information received from the order processing server 130 and/or from the customer information database 140 and/or from the inventory management database 160 and/or from a computing device 115a or 115b of a friend or family member of the customer 110. In the embodiment shown in FIG. 1, the customer alerts may be transmitted from the retailer computing device 150 via the network 125 to the customer computing device 120, and the customer computing device 120 may transmit data responsive to the customer alerts and/or other data to the retailer computing device 150 via the network 125. For example, the retailer computing device 150 may transmit a signal over the network 125 to the customer computing device 120 including an alert identifying a friend or family member of the customer who agreed to pick up the products 190 ordered by the customer 110 from the retail facility 180 associated with the geographic location of the customer 110. In some embodiments, customer alerts sent to the customer computing device 120 may include but are not limited to short message service (SMS) messages, electronic mail (e-mail) messages, instant messenger messages, voice mail messages, and/or push notifications (to a mobile application installed on the customer computing device 120).

In some embodiments, the control circuit 210 of the retailer computing device 150 may be programmed to transmit, via the network 125, a first electronic notification (i.e., an alert) including a query (e.g., via SMS, email, mobile app push notification, electronic mail, instant messenger, or the like) to a computing device 115a of a first friend or family member of the customer 110 determined to be located a shortest distance from the retail facility 180. For example, such an electronic query may request that the first friend or family member of the customer 110 indicate agreement or disagreement to pick up, at the retail facility 180 of the retailer, one or more products 190 ordered by the customer 110 from the retailer. The first friend or family member of the customer 110 may then use his or her computing device 115a to respond to this electronic notification or query by indicating (e.g., via the graphical interface 117a and/or input fields 119a of the computing device 115a) agreement or disagreement with picking up the products 190 for the customer 110 at the retail facility 180 of the retailer associated with a geographic location of the customer 110.

In one aspect, the control circuit 210 is configured to receive a response from the computing device 115a of the first friend or family member of the customer 110 indicating agreement by the first friend or family member of the customer 110 to pick up, at the retail facility 180 of the retailer, the products 190 ordered by the customer 110. In response to receiving a response indicating agreement to pick up the products 190 from the computing device 115a of the first friend or family member of the customer 110, the control circuit 210 of the retailer computing device 150 is programmed to transmit a second electronic notification to the customer computing device 120 to indicate to the customer 110 that the products 190 ordered by the customer 110 will be available for pick up at the geographic location of the first friend or family member of the customer 110.

In another aspect, the control circuit 210 is configured to receive a response from the computing device 115a of the first friend or family member of the customer 110 indicating disagreement by the first friend or family member of the customer 110 to pick up, at the retail facility 180 of the retailer, the products 190 ordered by the customer 110. In response to receiving a response indicating disagreement to pick up the products 190 from the computing device 115a of the first friend or family member of the customer 110, the control circuit 210 of the retailer computing device 150 is programmed to analyze geographic locations of other friends and family members of the customer 110 to determine a second friend or family member of the customer 110 located at a geographic location that is second closest (after the first friend or family member of the customer 110) to a geographic location of the retail facility 180 associated with a geographic location of the customer 110.

In one aspect, upon determining the second friend of family member of the customer 110 that is located second closest to the geographic location of the retail facility 180 associated with a geographic location of the customer 110, the control circuit 210 of the retailer computing device 150 is programmed to transmit (a third) electronic notification to the computing device 115b of the second friend or family member of the customer 110 requesting that the second friend or family member of the customer 110 indicate agreement or disagreement to pick up, at the retail facility 180, one or more products 190 ordered by the customer 110. Depending on whether the second friend or family member of the customer 110 agrees or disagrees to pick up the products 190 ordered by the customer 110 from the retail facility 180, the control unit 210 of the computing device is programmed to either perform an analysis as described above to determine a third friend or family member of the customer 110 located at a geographic location that is third closest (after the first and second friend or family member) to the geographic location of the retail facility 180 associated with a geographic location of the customer 110, or to notify the customer 110 to pick up the products 190 from the geographic location of the second friend or family member of the customer 110.

In some embodiments, the control unit 210 of the retailer computing device 150 may be programmed to send an electronic notification or alert including a query (e.g., via SMS, email, mobile app push notification, electronic mail, instant messenger, or the like) to the customer computing device 120. For example, such an electronic query may accompany an electronic customer alert indicating that a friend or family member of the customer agreed to pick up the products 190 ordered by the customer 110 from the retail facility 180 associated with the geographic location of the customer 110, and asking the customer 110 to respond via a graphical interface 122 on a display screen of the customer computing device 120 by indicating whether the customer 110 agrees with having this friend or family member pick up the products 190 for the customer 110 at the retail facility 180.

In one aspect, the customer 110 may then use the graphical interface 122 of his or her computing device 120 to respond to this query by indicating (e.g., by checking one or more appropriate input fields 124 of the graphical interface 122) that the customer 110 agrees to have the first friend or family member selected by the retailer computing device 150 pick up the products 190 for the customer 110. In response to receiving an indication of agreement (by the customer 110 that the first friend or family member of the customer 110 pick up the products 190) from the customer computing device 120, the control circuit 210 of the retailer computing device 150 is programmed to transmit an electronic notification to the computing device 115a of the first friend or family member of the customer 110 to notify the first friend or family member to go pick up the product 190 ordered by the customer 110 from the retail facility 180 associated with the geographic location of the customer 110. In another aspect, the customer 110 may use the customer computing device 120 to respond to this query by indicating (e.g., by checking one or more appropriate input fields 124 of the graphical interface 122) that the customer 110 does not agree to have the first friend or family member selected by the retailer computing device 150 pick up the products 190 for the customer 110 at the retail facility 180. In response to receiving an indication of disagreement (by the customer 110 that the first friend or family member of the customer 110 pick up the products 190) from the customer computing device 120, the control circuit 210 of the retailer computing device 150 is programmed to analyze geographic locations of other friends and family members of the customer 110 to determine a second friend or family member of the customer 110 located at a geographic location closest to a geographic location of the retail facility 180 associated with a geographic location of the customer 110.

In one aspect, upon determining the second friend or family member of the customer 110, and after receiving confirmation from the computing device 115b of the second friend or family member of the customer 110 of agreement to pick up the product 190 ordered by the customer 110 from the retail facility 180, the control circuit 210 is programmed to transmit (a third) electronic notification to the customer computing device 120 requesting that the customer 110 indicate agreement or disagreement to have the second friend or family member of the customer 110 pick up, at the retail facility 180, the one or more products 190 ordered by the customer 110. Depending on whether the customer 110 agrees or disagrees with having the second friend or family member of the customer 110 pick up the products 190 ordered by the customer 110 from the retail facility 180, the control unit 210 of the retailer computing device 150 is programmed to either perform an analysis as described above to determine a third friend or family member of the customer 110 located at a geographic location that is third closest (after the first and second friend or family member) to the geographic location of the retail facility 180 associated with a geographic location of the customer 110, or to notify the second friend or family member of the customer 110 (as described above) to pick up the products 190 from the retail facility 180 associated with the geographic location of the customer 110.

In the embodiment shown in FIG. 1, the retailer computing device 150 is coupled to an inventory management database 160. The retailer computing device 150 and the inventory management database 160 may be implemented as a single device at the retail facility 180 of the retailer as illustrated in FIG. 1. It will be appreciated, however, that the retailer computing device 150 and the inventory management database 160 may be separate devices, and may be located at different physical locations. In some embodiments, the inventory management database 160 may be stored, for example, on non-volatile storage media (e.g., a hard drive, flash drive, or removable optical disk) internal or external to the retailer computing device 150, or internal or external to computing devices separate and distinct from the retailer computing device 150. In some embodiments, the inventory management database 160 may be cloud-based.

The exemplary inventory management database 160 of FIG. 1 is configured to store electronic data associated with the products 190 ordered by the customer 110 and being picked up for the customer 110 at the retail facility 180 by a friend or family member of the customer 110. Some exemplary electronic data that may be stored in the inventory management database 160 may include, but is not limited to: electronic data indicating an inventory of available products 190 at the retail facility 180; electronic data indicating an identity of a friend or family member who agreed to pick up one or more products 190 for the order-placing customer 110 from the retail facility 180, and who was approved as a pick up person by the customer 110. For example, the inventory management database 160 may include electronic data identifying all products 190 ordered by a customer 110 in association with the name of a person (i.e., friend or family member of the customer 110) who was authorized by the customer 110 to pick up such products 190 for the customer 110 from the retail facility 180.

In some embodiments, the customer 110 may access, review, and/or update the electronic data in the customer information database 140 and/or the inventory management database 160 via the graphical interface 122 displayed to the customer 110 on the customer computing device 120. The graphical interface 122 may include one or more graphical input fields 124 in the form of menu options and/or sub-interfaces that permit the customer 110 to: manage product orders (e.g., by adding or removing one or more products 190 to or from the order of the customer 110 stored in the inventory management database 160); manage friends and family members of the customer 110 (e.g., by adding or removing one or more friend or family member to or from the list of friends and family members of the customer 110 stored in the customer information database 140); by pre-granting permission to one or more friends or family members of the customer 110 (stored in the customer information database 140) to pick up one or more products 190 ordered by the customer 110 from the retail facility 180; to provide a list of social media and networking websites that the customer 110 is a member of; and to update the customer's account information, alert notifications, as well as pick up options for products 190 ordered by the customer 110 from the retailer via the order processing server 130.

In some embodiments, the graphical interface 122 is configured with input fields 124 that permit the customer 110 to set and/or modify pick-up and/or alert options for one or more orders placed by the customer 110, as well as for any special instructions for any of the individual products 190 in such orders. For example, the customer 110 may utilize the graphical interface 122 of the customer computing device 120 to: define a specific date on which the products 190 are to be picked up by the friend or family member for the customer from the retail facility 180; define an interval for periodic pick up, by the friend or family member, of the products 190 ordered by the customer 110 from the retail facility 180; and define an identity (e.g., first and last name) of friends or family members of the customer 110 who are authorized (or not authorized) to pick up products 190 at the retail facility 180 for the customer 110.

Figure 3:
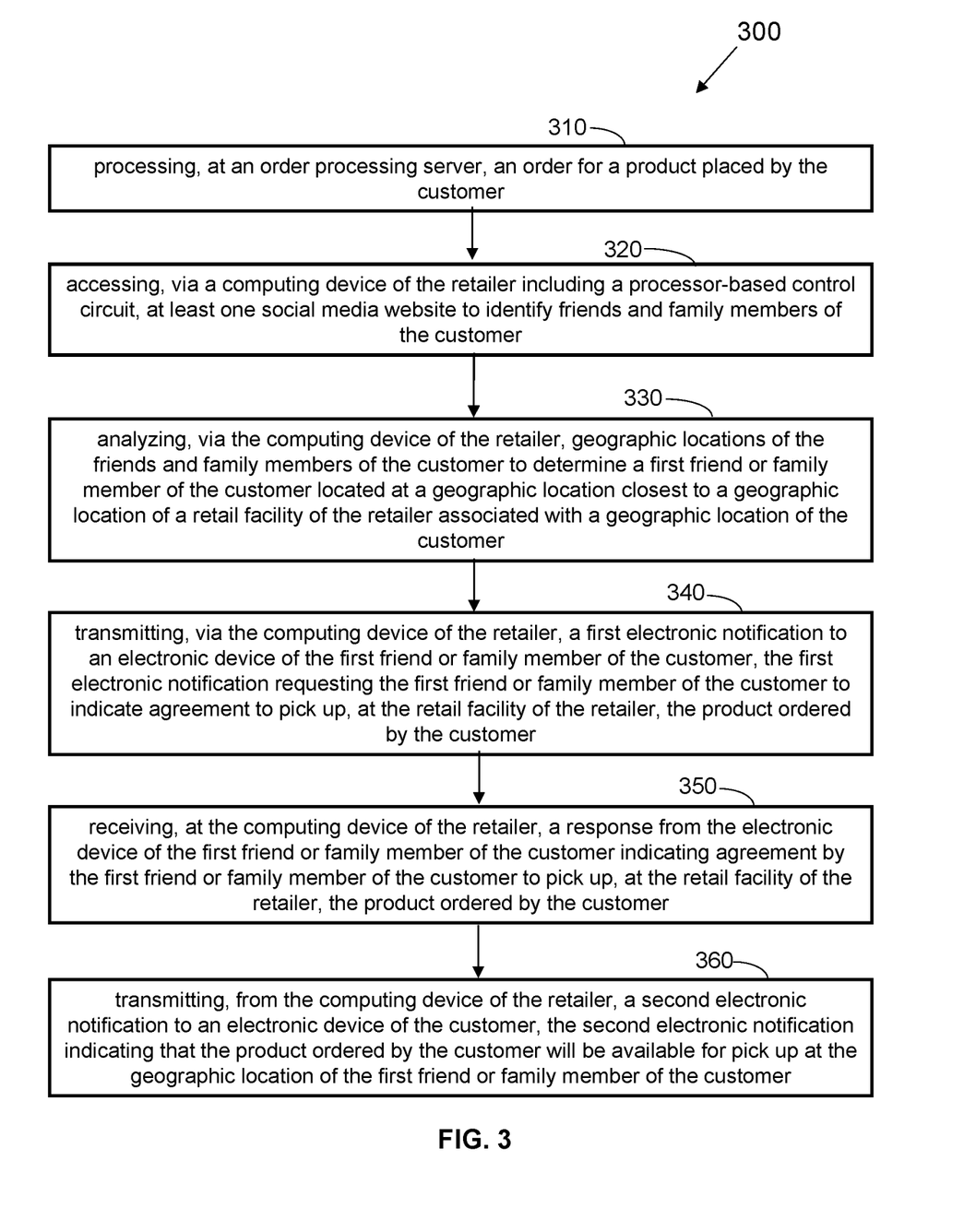
FIG. 3 is a flow chart diagram of a process of facilitating pick up of products purchased by a customer from a retailer by a friend or family member of the customer in accordance with some embodiments.

FIG. 3 shows an embodiment of an exemplary method 300 of facilitating pick up of products 190 purchased by a customer 110 over a network from a retailer. After a customer 110 purchases one or more products 190 from the retailer via an order processing server 130 of the retailer, the embodiment of the method 300 of FIG. 3 includes processing, at the order processing server 130 of the retailer, the purchase order placed by the customer 110 for the one or more products 190 (step 310). As discussed above, in the method 300 of FIG. 3, the customer 110 does not elect to have the ordered products 190 delivered by the retailer to the customer 110 or to personally pick up the ordered products 190 from the retail facility 180, but instead elects (via the graphical interface 122 of the customer computing device 120) to have the products 190 ordered by the customer 110 picked up from the retail facility 180 associated with the geographic location of the customer 110 by a friend or family member of the customer 110.

After the purchase order of the customer 110 for one or more products 190 is processed at the order processing server 130, the exemplary method 300 further includes accessing, via a retailer computing device 150 including a processor-based control circuit 210, at least one social media website to identify friends and family members of the customer 110 (step 320). In one aspect, after a customer 110 elects pick up of the products 190 ordered by the customer 110 from the retail facility 180 by a friend or family member of the customer 110, the retailer computing device 150 queries the customer information database 140 to determine whether a list of friends and family members of the customer 110 is stored in the customer information database 140. In some embodiments, if the customer information database 140 already includes a list of friends and family members of the customer 110 accumulated, based on either the retailer computing device 150 accessing social media websites to identify friends and family members of the customer 110, or based on the customer 110 expressly identifying his or her friends and family members when setting up an account with the retailer. In some embodiments, the customer information database 140 does not yet include a list of friends and family members of the customer 110 (e.g., the customer 110 is a new customer of the retailer), and the retailer computing device 150 is configured to access one or more social media websites such as Facebook, Instagram, Twitter, LinkedIn, or the like to identify friends and family members of the customer 110.

After the friends and family members of the customer 110 placing an order via the order processing server 130 of the retailer are identified by the retailer computing device 150, the exemplary method 300 of FIG. 3 includes analyzing, via the retailer computing device 150, geographic locations of the friends and family members of the customer 110 to determine a first friend or family member of the customer 110 located at a geographic location closest to a geographic location of a retail facility 180 of the retailer associated with a geographic location of the customer 110 (step 330). In one aspect, this analysis is performed by obtaining publicly available addresses of the friends and family members of the customer 110 who were identified when accessing the social media websites, and by using map-based analytics to measure a distance from the address of each identified friend or family members of the customer 110 to the address of the retail facility 180 of the retailer associated with the geographic location of the customer 110. In some embodiments, if the customer information database 140 already includes a list of friends and family members of the customer 110, the friends and family members of the customer may be ranked in order of being closest to furthest (distance-wise) to a retail facility 180 of the retailer associated with the geographic location of the customer 110.

After the retailer computing device 150 determines which friend or family member of the customer 110 who ordered products 190 from the retailer is located geographically closest to the retail facility 180 associated with the geographic location of the customer 110, this friend or family member is designated in the customer information database 140 as the first friend or family member of the customer, and the friend or family member of the customer 110 is located geographically second closest to the retail facility 180 is designated in the customer information database 140 as the second friend or family member of the customer 110, and so on. In the embodiment illustrated in FIG. 3, after the first friend or family member of the customer 110 is determined by the retailer computing device 150, the method 300 includes the step of transmitting, via the retailer computing device 150, a first electronic notification to a computing device 115a of the first friend or family member of the customer 110, with the first electronic notification requesting the first friend or family member of the customer 110 to indicate agreement to pick up, at the retail facility 180, the product 190 (or products 190) ordered by the customer 110 (step 340). As described above, in some embodiments, such a transmission may be made by the retailer computing device 150 to the computing device 115a of the first friend or family member of the customer 110 via the network 125 (which may be an internet-based or an intranet-based network).

In one aspect, after the first friend or family member of the customer 110 receives the above-described first electronic notification from the retailer computing device 150 over the network 125 and uses the graphical interface 117a of his or her computing device 115a to indicate agreement or disagreement to pick up the products 190 for the customer 110, this agreement or disagreement by the first friend or family member of the customer 110 is transmitted from the computing device 115a of the first friend or family member of the customer 110 via the network 125 to the retailer computing device 150. Then, in some embodiments, the method 300 of FIG. 3 further includes receiving, at the retailer computing device 150, a response from the computing device 115a of the first friend or family member of the customer 110 indicating agreement by the first friend or family member of the customer 110 to pick up, at the retail facility 180, the product 190 (or products 190) ordered by the customer 110 (step 350).

In some embodiments, the method 300 may include receiving, at the retailer computing device 150 of the retailer, a response from the computing device 115a of the first friend or family member of the customer 110 indicating that the first friend or family member of the customer 110 does not agree to pick up, at the retail facility 180, the product 190 (or products 190) ordered by the customer 110. If the first friend or family member of the customer 110 does not agree to pick up the products 190 ordered by the customer 110 from the retail facility 180 for whatever reason (e.g., traveling, no longer residing at the publicly listed address, or no longer friends with the customer 110), the method 300 may include analyzing, via the retailer computing device 150 (e.g., via accessing the customer information database 140), geographic locations of other friends and family of the customer 110 to determine at least a second friend or family member of the customer 110 located at a geographic location that is second closest to the geographic location of the retail facility 180 after the geographic location of the first friend or family member of the customer 110 determined to be the closest, but who did not agree to pick up the products 190 for the customer 110 from the retail facility 180. In one aspect, after a determination of such a second friend or family member of the customer 110 is made by the retailer computing device 150, the method 300 may include transmitting a third electronic notification to a computing device 115b of the second friend or family member of the customer 110, with the third electronic notification requesting the second friend or family member of the customer 110 to indicate agreement to pick up, at the retail facility 180, the product 190 (or products 190) ordered by the customer 110 from the retailer.

In the embodiment of FIG. 3, after the first friend or family member of the customer 110 indicates agreement to pick up the products 190 ordered by the customer 110 from the retail facility 180 associated with the geographic location of the customer 110, and such agreement is transmitted via the network 125 from the computing device 115a of the first friend or family member of the customer 110 to the retailer computing device 150, the method 300 includes transmitting, from the retailer computing device 150 of the retailer, a second electronic notification to a customer computing device 120, with the second electronic notification indicating that the product 190 ordered by the customer 110 will be available for pick up at the geographic location of the first friend or family member of the customer 110. In some embodiments, when the first friend or family member arrives at the retail facility 180 to pick up the products 190 for the customer 110, the method 300 may further include checking authentication credentials of the first friend or family member of the customer 110 to verify an identify of the first friend or family member of the customer 110 to ensure that the person attempting to pick up the products 190 for the customer 110 at the retail facility 180 is in fact authorized to pick up the products 190. In one aspect, after the products 190 are picked up by the first friend or family member of the customer from the retail facility 180, the method 300 may further include transmitting, from the retailer computing device 150, an electronic notification to the customer computing device 120 to alert the customer 110 that the products 190 ordered by the customer were picked up by an authorized friend or family member of the customer 110 from the retail facility 180.

In one aspect, the customer 110 is given an option to accept or not accept the first friend or family member chosen by the retailer computing device 150 for pick-up of the products 190 ordered by the customer 110 from the retailer. To that end, the second electronic notification transmitted by the retailer computing device 150 to the customer computing device 120 includes a graphical interface 122 including input fields 124 configured to enable the customer 110 to indicate agreement or disagreement with picking up the product ordered by the customer 110 from the first friend or family member of the customer 110.

In some embodiments, upon receiving, at the retailer computing device 150, a response from the customer computing device 120 indicating that the customer 110 does not agree to pick up the product 190 ordered by the customer 110 from the first friend or family member of the customer 110, the method 300 may further include analyzing geographic locations of the friends and family of the customer 110 (e.g., stored in the customer information database 140) to determine at least a second friend or family member of the customer 110 located at a geographic location that is second closest to the geographic location of the retail facility 180 associated with the geographic location of the customer 110 after the geographic location of the first friend or family member of the customer 110 who was disapproved by the customer 110 for picking up the products 190 ordered by the customer 110. When the retailer computing device 150 determines the identity of a second friend or family member of the customer 110 who is located second closest distance-wise to the retail facility 180 associated with the geographic location of the customer 110, the method 300 may further include transmitting a third electronic notification to a computing device 115b of the second friend or family member of the customer 110, with the third electronic notification requesting the second friend or family member of the customer 110 to confirm whether the second friend or family member of the customer 110 agrees to pick up, at the retail facility 180, the product 190 (or products 190) ordered by the customer 110.

In one aspect, after the retailer computing device 150 of the retailer determines the second friend of family member of the customer 110 who may pick up products 190 for the customer 110 at the retail facility 180, the method 300 may include transmitting, from the retailer computing device 150 via the network 125, a third electronic notification to the computing device 115b of the second friend or family member of the customer 110, with the third electronic notification requesting that the second friend or family member of the customer 110 indicate agreement or disagreement to pick up, at the retail facility 180, one or more products 190 ordered by the customer 110. Depending on whether the second friend or family member of the customer 110 agrees or disagrees to pick up the products 190 ordered by the customer 110 from the retail facility 180, the method 300 may further include either an analyzing step akin to step 330 to determine a third friend or family member of the customer 110 located at a geographic location that is third closest (after the first and second friend or family member) to the geographic location of the retail facility 180 associated with a geographic location of the customer 110, or a transmitting step akin to step 360 to notify the customer 110 (as described below) to pick up the products 190 from the second friend or family member.

In one aspect, upon determining the second friend or family member of the customer 110, and after receiving confirmation from the computing device 115b of the second friend or family member of the customer 110 of agreement to pick up the product 190 ordered by the customer 110 from the retail facility 180, the method 300 may include transmitting, from the retailer computing device 150 via the network 125, a third electronic notification to the customer computing device 120, with the third electronic notification requesting that the customer 110 indicate agreement or disagreement to have the second friend or family member of the customer 110 pick-up, at the retail facility 180, the one or more products 190 ordered by the customer 110. Depending on whether the customer 110 agrees or disagrees with having the second friend or family member of the customer 110 pick up the products 190 ordered by the customer 110 from the retail facility 180, the method 300 may include an analyzing step akin to step 330 to determine a third friend or family member of the customer 110 located at a geographic location that is third closest (after the first and second friend or family member) to the geographic location of the retail facility 180 associated with a geographic location of the customer 110, or a transmitting step akin to step 360 to notify the second friend or family member of the customer 110 (as described above) to pick up the products 190 from the retail facility 180 associated with the geographic location of the customer 110.

The systems and methods described herein advantageously allow customers to purchase products from a retailer and have a friend or family member pick up such products from the retail facility of the retailer associated with the geographic location of the customer 110. Accordingly, the customers are provided with an ability to either pick up the products they order from their friends or family members instead of the retail facility, or to have such products delivered to their home by their friends or family members. Such systems and methods provide a significant time savings and convenience for the customers of the retailer and are likely to increase customer loyalty to the retailer.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for facilitating pick up of products purchased over a network by a customer from a retailer, the system comprising:
   an electronic customer information database configured to store electronic data associated with geographic locations of friends and family members of the customer;
   an order processing server of the retailer configured to process an order for a product placed by the customer, the order processing server being configured to permit the customer to elect, via a computing device of the customer, to have the product ordered by the customer be picked up by a friend or a family member of the customer;
   a computing device of the retailer including a processor-based control circuit, the computing device configured to access the electronic customer information database to obtain the electronic data associated with the geographic locations of the friends and family members of the customer, wherein the control circuit is configured to:
   identify, based on the electronic data obtained from the customer information database, the geographic locations of the friends and family members of the customer;
   analyze the identified geographic locations of the friends and family members of the customer to determine a first friend or family member of the customer located at a geographic location closest to a geographic location of a retail facility of the retailer associated with a geographic location of the customer;
   transmit a first electronic notification to a computing device of the first friend or family member of the customer, the first electronic notification being configured to cause a first graphical interface to be displayed on the computing device of the first friend or family member, the first graphical interface requesting the first friend or family member of the customer to select at least one input field within the first graphical interface to indicate agreement to pick up, at the retail facility of the retailer, the product ordered by the customer;
   in response to a selection by the customer of the at least one input field within the first graphical interface, receive a response from the computing device of the first friend or family member of the customer indicating agreement by the first friend or family member of the customer to pick up, at the retail facility of the retailer, the product ordered by the customer; and
   transmit a second electronic notification to the computing device of the customer, the second electronic notification being configured to cause a second graphical interface to be displayed on the computing device of the customer, the second graphical interface indicating that the product ordered by the customer will be available for pick up at the geographic location of the first friend or family member of the customer.

2. The system of claim 1, wherein the first and second electronic notifications comprise at least one of: a mobile app notification, a short-message-service (SMS) message, an electronic mail, and an instant messenger message.

3. The system of claim 1, wherein the control circuit is further configured to receive a response from the computing device of the first friend or family member of the customer indicating that the first friend or family member of the customer does not agree to pick up, at the retail facility of the retailer, the product ordered by the customer.

4. The system of claim 3, wherein the control circuit is further configured to analyze geographic locations of the friends and family of the customer to determine at least a second friend or family member of the customer located at a geographic location that is second closest to the geographic location of the retail facility of the retailer after the geographic location of the first friend or family member of the customer.

5. The system of claim 4, wherein the control circuit is further configured to transmit a third electronic notification to a computing device of the second friend or family member of the customer, the third electronic notification requesting the second friend or family member of the customer to indicate agreement to pick up, at the retail facility of the retailer, the product ordered by the customer.

6. The system of claim 1, wherein the second electronic notification comprises a graphical interface including at least one input field configured to enable the customer to indicate agreement or disagreement with picking up the product ordered by the customer from the first friend or family member of the customer.

7. The system of claim 1, wherein the control circuit is further configured to receive a response from the computing device of the customer indicating that the customer does not agree to pick up the product ordered by the customer from the first friend or family member of the customer.

8. The system of claim 7, wherein the control circuit is further configured to:
   analyze geographic locations of the friends and family of the customer to determine at least a second friend or family member of the customer located at a geographic location that is second closest to the geographic location of the retail facility of the retailer after the geographic location of the first friend or family member of the customer; and
   transmit a third electronic notification to a computing device of the second friend or family member of the customer, the third electronic notification requesting the second friend or family member of the customer to confirm whether the second friend or family member of the customer agrees to pick up, at the retail facility of the retailer, the product ordered by the customer.

9. A method of facilitating pick up of products purchased over a network by a customer from a retailer, the method comprising:
   providing an electronic customer information database configured to store electronic data associated with geographic locations of friends and family members of the customer;
   processing, at an order processing server, an order for a product placed by the customer, and permitting, the customer to elect, via a computing device of the customer, to have the product ordered by the customer be picked up by a friend or a family member of the customer;
   accessing, via a computing device of the retailer including a processor-based control circuit, the electronic customer information database to obtain the electronic data associated with the geographic locations of the friends and family members of the customer;
   identifying, via the computing device of the retailer and based on the electronic data obtained from the customer information database, the geographic locations of the friends and family members of the customer;
   analyzing, via the computing device of the retailer, the identified geographic locations of the friends and family members of the customer to determine a first friend or family member of the customer located at a geographic location closest to a geographic location of a retail facility of the retailer associated with a geographic location of the customer;
   transmitting, via the computing device of the retailer, a first electronic notification to a computing device of the first friend or family member of the customer, the first electronic notification causing a first graphical interface to be displayed on the computing device of the first friend or family member, the first graphical interface requesting the first friend or family member of the customer to select at least one input field within the first graphical interface to indicate agreement to pick up, at the retail facility of the retailer, the product ordered by the customer;
   in response to a selection by the customer of the at least one input field within the first graphical interface, receiving, at the computing device of the retailer, a response from the computing device of the first friend or family member of the customer indicating agreement by the first friend or family member of the customer to pick up, at the retail facility of the retailer, the product ordered by the customer; and
   transmitting, from the computing device of the retailer, a second electronic notification to the computing device of the customer, the second electronic notification causing a second graphical interface to be displayed on the computing device of the customer, the second graphical interface indicating that the product ordered by the customer will be available for pick up at the geographic location of the first friend or family member of the customer.

10. The method of claim 9, wherein the first and second electronic notifications comprise at least one of: a mobile app notification, a short-message-service (SMS) message, an electronic mail, and an instant messenger message.

11. The method of claim 9, wherein the transmitting the first electronic notification step further comprises receiving, at the computing device of the retailer, a response from the computing device of the first friend or family member of the customer indicating that the first friend or family member of the customer does not agree to pick up, at the retail facility of the retailer, the product ordered by the customer.

12. The method of claim 11, wherein the analyzing step further comprises analyzing geographic locations of the friends and family of the customer to determine at least a second friend or family member of the customer located at a geographic location that is second closest to the geographic location of the retail facility of the retailer after the geographic location of the first friend or family member of the customer.

13. The method of claim 12, further comprising transmitting a third electronic notification to a computing device of the second friend or family member of the customer, the third electronic notification requesting the second friend or family member of the customer to indicate agreement to pick up, at the retail facility of the retailer, the product ordered by the customer.

14. The method of claim 9, wherein the second electronic notification comprises a graphical interface including at least one input field configured to enable the customer to indicate agreement or disagreement with picking up the product ordered by the customer from the first friend or family member of the customer.

15. The method of claim 9, wherein the transmitting the second electronic notification step further comprises receiving, at the computing device of the retailer, a response from the computing device of the customer indicating that the customer does not agree to pick up the product ordered by the customer from the first friend or family member of the customer.

16. The method of claim 15, further comprising:
   analyzing geographic locations of the friends and family of the customer to determine at least a second friend or family member of the customer located at a geographic location that is second closest to the geographic location of the retail facility of the retailer after the geographic location of the first friend or family member of the customer; and
   transmitting a third electronic notification to a computing device of the second friend or family member of the customer, the third electronic notification requesting the second friend or family member of the customer to confirm whether the second friend or family member of the customer agrees to pick up, at the retail facility of the retailer, the product ordered by the customer.

* * * * *